United States Patent [19]
Korpel

[11] 4,142,098
[45] Feb. 27, 1979

[54] OPTICAL READOUT FOR REFLECTIVE VIDEO DISCS

[75] Inventor: Adrianus Korpel, Prospect Heights, Ill.

[73] Assignee: Zenith Radio Corporation, Glenview, Ill.

[21] Appl. No.: 813,036

[22] Filed: Jul. 5, 1977

[51] Int. Cl.² .................................................. G01V 1/20
[52] U.S. Cl. ........................................ 250/201; 358/128
[58] Field of Search ................... 250/201, 202, 209; 358/128; 179/100.3 V, 100.3 G

[56] References Cited

U.S. PATENT DOCUMENTS

| | | | |
|---|---|---|---|
| 3,705,771 | 12/1972 | Friedman et al. | 356/39 |
| 3,971,002 | 7/1976 | Bricot et al. | 179/100.3 V |
| 4,038,524 | 7/1977 | Puech et al. | 358/128 |
| 4,057,833 | 11/1977 | Braat | 358/128 |
| 4,059,841 | 11/1977 | Bricot et al. | 250/201 |

Primary Examiner—David C. Nelms
Attorney, Agent, or Firm—Cornelius J. O'Connor

[57] ABSTRACT

The invention concerns an optical detection system for retrieving information stored in a record track which effectively constitutes a sequence of light scattering or light deflecting elements. An objective lens, disposed above the record track, forms a reading spot for interrogating the track as it is moved past the spot. A photodetector, also disposed above the track, is located in the far field of the reading spot and outside the cone of focused light established by the lens in forming that spot to monitor the time-varying diffraction pattern of the spot reflected from the interrogated portion of the track. Upon receipt of scattered or reflected light rays, the photodetector derives an electrical signal representative of the stored information.

1 Claim, 8 Drawing Figures

OPTICAL READOUT FOR REFLECTIVE VIDEO DISCS

This invention relates in general to an arrangement for retrieving recorded information. More particularly, the invention concerns a reflective mode optical system for detecting time dependent information signals which have been spatially recorded on a disc.

BACKGROUND OF THE INVENTION

Video disc systems are known in which a video program, pre-recorded upon a disc, is played back through a television receiver by resort to a procedure which, in general, is similar to the playback of audio records. While known playback systems contemplate a variety of approaches, e.g. optical, capacitive, mechanical (pressure), etc., the present invention finds particular application in the optical system, accordingly, the invention will be described in that environment.

Optical image reproducing systems that permit playback of pre-recorded program material through a television receiver have been proposed to augment the utility of such receivers. The program is stored in a medium such as a disc, not unlike the familiar audio disc, which is interrogated by a beam of coherent light derived from a laser and converged by lens action to a finely focused reading spot. This beam is monitored by a photo detector which serves to develop an electrical signal representative of the stored information. The stored program can include, luminance, chroma and audio information, as well as synchronizing components. This information is positioned in segments of the frequency spectrum which are convenient for disc recording but at the same time subject to transformation in a transcoder so as to assume a frequency distribution typical of a commercial telecast. Since such telecasts feature two interlaced fields for each picture frame, the storage track of the video disc favors the form of a multi-turn spiral in which each convolution of the spiral contains two fields of an image frame together with synchronizing information.

Program information may be stored in the track of an optical video disc in a variety of ways, for example, in formed hill and dale grooves similar to audio recordings or, in a succession of concavities or pits alternating with a like succession of lands disposed along the track. While the invention can be used with either type of recording, there presently appears to be greater interest in the pit and land arrangement, therefore, the invention will be described in connection with a storage track of that format.

The pits and lands constituting the information storage track generally have a uniform width but their length, along the track direction, is variable so that, collectively, the pits and lands comprise a spatial representation of the temporal variations of a pulsed carrier signal modulated in frequency and duty cycle (i.e. density and width of the pulses). This signal conveys the program information and thus is employed to control the formation of the record track on a disc master during the recording process.

The stored information is retrieved by scanning the track with a reading beam and utilizing a photo receptor to respond to beam after it has interrogated the track. In the case where the disc is transmissive to the read beam, the photo receptor can be positioned beneath the disc to collect a portion of the light transmitted there through. On the other hand, where the disc is a reflective device, the photo receptor is located on the same side of the disc as the incident, or reading, beam so as to respond to light reflected from the track. In either case, the pits diffracted (deflect or scatter) the light of the reading beam. In monitoring the degree of scattering or deflection of the light, the photo receptor develops an electrical signal which is modulated in accordance with the stored information.

Although the term scattering is commonly used to describe in general the affect of small pits or irregularities on a beam of incident light, we shall use this term in a more specific sense, that is, as it relates to a particular type of a video disc, the so-called $\frac{1}{2}\lambda$ or half wavelength type. In this type of disc the depth of the pit is so chosen that there exists a one-half wavelength optical path difference between rays traversing a pit and rays traversing the adjoining land area. Also, the focused spot of light straddles the track, i.e. it is wider in the radial direction than the pits themselves. It may be shown that under these conditions the incident light is scattered symmetrically in a radial direction (radial scattering) whenever a pit intercepts the focused beam of light. This scattering is minimal when the center of the spot of light coincides with the center of the pit and, as the final information is derived from scattering, we see that this mode of operation detects primarily the center of the pit and determines where the pit edges are by monitoring the decrease in scattered light when the pit moves out from under the beam.

We shall use the term deflection with specific reference to the so-called $\frac{1}{4}\lambda$ (one-quarter wavelength) type of disc. In this type of disc, described in U.S. Pat. No. 3,931,459, which issued to the present inventor, the depth of the pit is chosen such that there exists a one-quarter wavelength optical path difference between rays traversing a pit and rays traversing the adjoining land area. The focused beam of light need not straddle the track, at least not for video readout, although it may do so for purposes of deriving information for radial tracking. It may be shown that, in this type of operation, the light is deflected sideways whenever an edge of the pit intercepts the reading beam and, furthermore, that the sense of deflection depends on the position of the land area with respect to the beam. Thus the beginning and end of the pit will deflect the light tangentially in different directions and from this information, detected by a suitable electro-optic system, the radio frequency signal is derived. It will be clear that such a tangential deflection system will detect the edges of the pit rather than the center, as is the case in a radial scattering system. If, in a $\frac{1}{4}\lambda$ system, the beam is designed to straddle the track radially, there will also be deflection in the radial direction both toward the inside and the outside of the disc. The relative amount of light deflected in each of these two directions is an indication of the position of the center of the beam relative to the center of the track in a radial sense. Thus, information derived from radial deflection may be used for deriving the error signal needed to keep the beam on track by means of a beam steering servo system.

Although historically the $\frac{1}{4}\lambda$ system has been used with transmissive discs and the $\frac{1}{2}\lambda$ system with reflective discs, there are no compelling technical reasons for this and in theory transmissive and reflective discs are possible in either system.

An optical video system having particular application to a transmissive type disc is described in U.S. Pat. No.

3,919,562 which issued to Robert L. Whitman on Nov. 11, 1975. On the other hand, an optical video system operating in the reflective mode is described in U.S. Pat. No. 3,959,581 which issued on May 25, 1976 to Leonard J. Laub.

Other reflective mode systems include the arrangements shown in U.S. Pat. Nos. 3,962,720 and 3,969,576. Insofar as these prior are reflective mode systems are concerned, it is readily apparent that they are characterized by rather sophisticated optics which are required in order to separate the reflected diffracted beam from the incident coherent read beam. Specifically, spatial filtering apparatus such as Wollaston prisms or other types of beam splitters are employed to effect the necessary beam separation in prior art reflective mode systems.

OBJECTS OF THE INVENTION

Accordingly, it is a principal object of the invention to provide an improved optical detector for use with a reflective type video disc.

It is also an object of the invention to provide a relatively simple and inexpensive optical read out system for a reflective video disc.

It is a specific object of the invention to provide an optical read out system for a reflective video disc which dispenses with spatial filters.

SUMMARY OF THE INVENTION

An optical system is disclosed for detecting a time varying information signal, which has been converted to a modulated carrier and spatially recorded upon a record disc. The recording effectively constitutes a sequence of light scattering or deflecting elements such as pits (or bumps) along an elongated spiral track, which sequence comprises a spatial pattern that is representative of the modulated carrier. The optical detection system comprises means for supporting and rotating the record disc in a reading plane and means for developing an optical read beam. A means, which includes an objective lens, is disposed in the path of the read beam and on a predetermined side of the disc for focusing that beam into a reading spot on the record track. The reading spot has dimension, relative to the spatial pattern of the track, which is sufficient to resolve the highest spatial frequency of the recorded carrier. Drive means are provided for displacing the record, relative to the reading spot, at a predetermined velocity to effect an interrogation of the track by the reading spot so as to cause to be developed a reflected time varying diffraction pattern of the spot that corresponds to the recorded spatial pattern. The diffraction pattern itself comprises a distribution of scattered light which is oriented predominantly in one or more predetermined directions relative to the track. Finally, light responsive means, comprising a quadrant or, photodectors, is disposed on the same side of the disc as the objective lens and in the far field of the focused spot and outside the reflected cone of focused light established by the objective lens in forming the reading spot in the absence of perturbations. The light responsive means monitors the light distribution of the diffraction pattern reflected from the interrogated portion of the track so as to derive an electrical signal which is representative of the stored information.

BRIEF DESCRIPTION OF THE DRAWINGS

The features of the present invention which are believed to be novel are set forth with particularity in the appended claims. The invention, together with further objects and advantages thereof, may best be understood by reference to the following description, taken in conjunction with the following drawings, in the several figures of which like reference numerals identify like elements and in which:

DESCRIPTION OF THE PREFERRED EMBODIMENT

Prior to commencing discussion of the invention, it should be noted that illustrations of portions of the disclosed optical detection system, as well as certain explanatory diagrams, have been intentionally exaggerated in order to facilitate their presentation, as well as an understanding of the invention.

Figure 1:
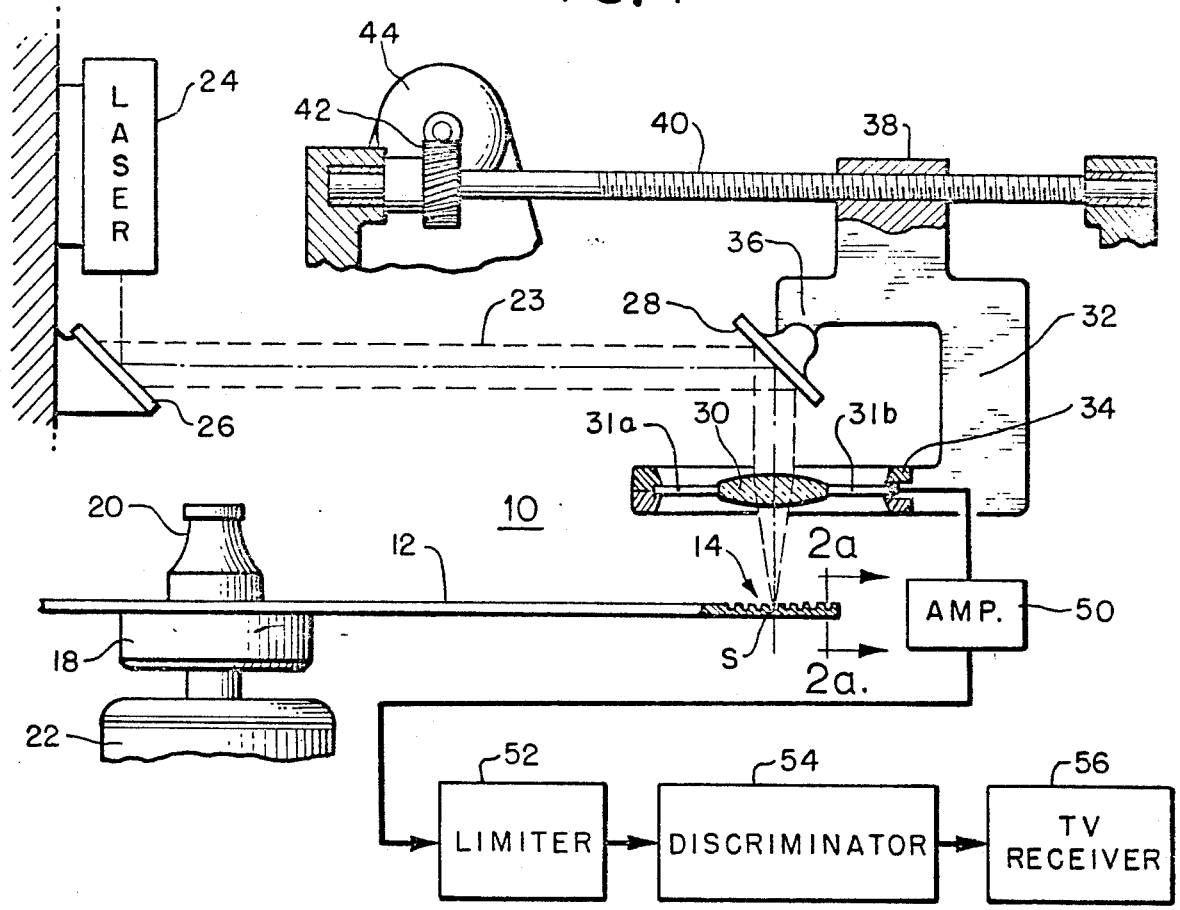
FIG. 1 is a fragmentary elevational view of an optical readout system constructed in accordance with the invention for use with a reflective video disc.

Accordingly, the optical playback system 10 depicted in FIG. 1 serves to detect time dependent information signals, for example video signals, which have been converted to a modulated carrier and spatially recorded on the surface of the storage medium, such as the disc 12, which disc preferably comprises polyvinyl chloride. The particular manner in which the information signal is recorded upon the disc is of no concern in that resort may be had to either the mechanical or photographic techniques adverted to previously. For purposes of discussion it will be assumed that the recorded information adopts the shape of an elongated spiral track 14 comprising a train of pits 16, interspersed with lands 17, impressed in the upper surface of disc 12; a longitudinal section through a portion of this track is shown in FIG. 2a. It will also be assumed that the disc is of the $\frac{1}{4}\lambda$ type as described before.

One approach to optically detecting information stored in the track of a reflective disc contemplates monitoring the track with a beam of coherent light. The beam is converged by an optical focusing apparatus having a relatively high numerical aperture (NA) so that the illuminating or reading spot S derived therefrom is of such a minute dimension as to be capable of resolving the highest spatial frequency of the recorded modulated carrier. In other words, the spot must be able to analyze an increment of the carrier signal that can be represented by a pit.

Turning now to the structural details of system 10, and referring again to FIG. 1, disc 12 is disclosed as supported upon the spindle 18 of a playback deck and secured thereon by a cap 20. The lower extremity of the spindle is coupled to a synchronous motor 22 which serves to rotate the disc at a predetermined velocity. In order to read track 14, the optical detection system 10 utilizes a beam 23 of mono-chromatic coherent light which is produced by a laser 24. The laser may be positioned at any convenient location since the beam therefrom can be directed by the mirrors 26, 28 to the focusing means, specifically, to the objective lens 30 which is supported above disc 14 in a manner to be detailed below. Mirror 28 can be provided with a universal mount so as to be adjustable in two orthogonal planes to maintain radial, as well as tangential, tracking registration. Such tangential registration is often necessary to ensure the accuracy of synchronization signals and reference signals. In this regard, an apparatus of the type described in U.S. Pat. No. 3,946,166 is admirable suited for the mirror mount.

Lens 30 has a numerical aperture which is such that the read spot S formed from incident beam $23i$ is small enough to resolve the highest spatial frequency recorded on the disc. In other words, the dimension of the spot, in the longitudinal direction of the track is less than the wave length of the highest spatial frequency desired to be detected. Thus, the read spot should be small enough, in the track direction, to detect the individual pits representative of the highest modulated carrier frequency. On the other hand, to ensure radial scattering of the focused beam by the pits, the focused spot has a diameter sufficient to straddle the track.

Figure 2:
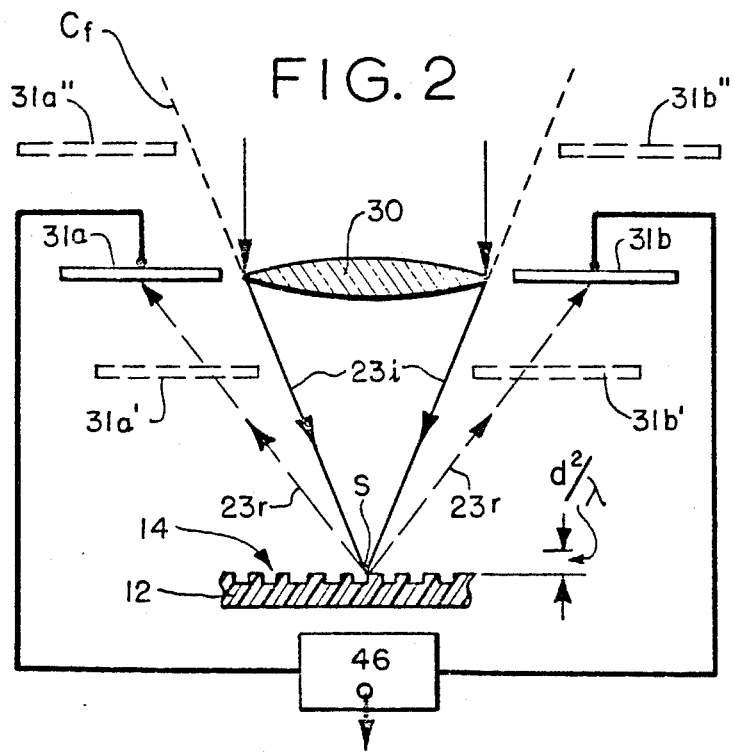
FIG. 2 is a frontal elevational view, partly in section, of a portion of the system shown in FIG. 1 that details placement of the photodetector arrangement.
Figure 2B:
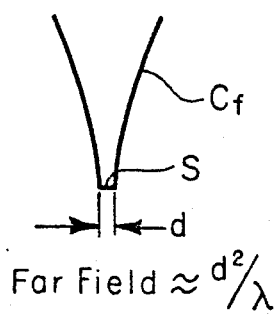
FIG. 2b is an explanatory drawing showing the focal point of a read spot in a manner that is helpful to an understanding of the far field concept.
Figure 2A:
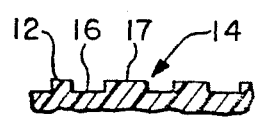
FIG. 2a is a detail of part of a longitudinal section of a spatially recorded track of the video disc shown in FIG. 1.
Figure 3:
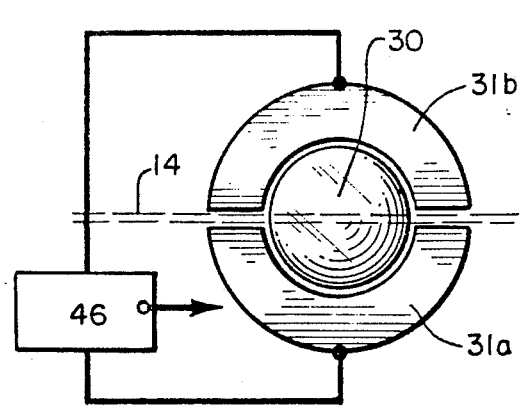
FIG. 3 is a plan view of the photodetector arrangement of FIG. 1 particularly useful for collecting radially scattered light.

As best seen in FIGS. 2 and 3, a pair of photodetectors 31a, 31b, are supported above disc 12. Collectively, they comprise an annular light responsive means located, preferably, in the vicinity of the plane of the objective lens and symmetrically disposed thereabout. This choice of location, however, has a degree of latitude; actually, the principal restrictions governing the placement of photodetectors 31a, 31b are: (1) that they be positioned in the far field of the focus of the reflected beam $23r$ and: (2) that they be located outside the cone of focused light $C_F$ established by lens 30 in forming reading spot S. Accordingly, detectors 31a, 31b may be positioned, as shown in FIG. 2, closer to the disc, as indicated by the broken construction line representations 31a', 31b', or they may be positioned more remotely as indicated by representations 31a'', 31b''.

As above noted, a critical factor respecting photodetector placement, other than being positioned outside the cone $C_F$, is that they reside in the far field of the focused spot. More particularly, far field is defined as that region of the reflected scattered light that is displaced from the focal point of the read spot by a distance greater than approximately $d^2/\lambda$, where d is the diameter of the spot and $\lambda$ is the wavelength of the light forming the spot. As the dimension d is usually of the order of the wavelength of light itself, the far field requirement is satisfied for distances greater than several wavelengths of light. Clearly, for any practical arrangement photodetectors 31a, 31b (in any of the disclosed placements) are in the far field.

To enable the spot produced by lens 30 to interrogate track 14, mirror 28, lens 30 and the photodetectors 31a, 31b are supported upon a carriage 32 for conjoint travel along a path normal to the track and thus coincident with a radius of the disc. As shown in FIG. 1, lens 30 and photodetectors 31a, 31b are supported by an arm 34 extending from carriage 32 while mirror 28 depends from an upper frame member 36 of the carriage.

To facilitate a radial displacement of the optical reading apparatus, carriage 32 includes the housing portion 38 which threadably receives a rotatably mounted lead screw 40. The lead screw is effectively oriented perpendicular to track 14 of the disc to assure accurate radial travel of lens 30 and the photodetector arrangement. A pinion 42, fitted to one end of the lead screw, couples the lead screw to a driver 44 which can comprise an electric motor and gearing complex arranged to coordinate the radial displacement of the carriage with the rotational speed of the disc.

FIG. 3, which offers a plan view of photodetectors 31a, 31b shows that these detectors comprise confronting semiannular shaped elements that substantially surround objective lens 30 and straddle track 14. This placement of photodetectors 31a, 31b enables them to collect radially scattered light reflected from the interrogated portion of track 14. As shown, the outputs of detectors 31a, 31b are applied to the input terminals of a summing amplifier 46. Naturally, in this mode of operation, the two photodiodes could be replaced by one single annular shaped diode.

The manner in which the photodetector arrangement of FIGS. 1–3 serves to derive an output signal will now be discussed. When motor 22 is energized to rotate disc 12, relative to the light spot S, driver 44 is simultaneously energized to produce a controlled inward radial displacement of the objective lens 30 and the photodetectors 31a, 31b so as to effect a scan of track 14. As the sequence of pits forming track 14 passes beneath the reading spot S, a time-varying diffraction pattern of the spot is reflected from the track back toward the objective lens and the photodetectors. By positioning photodetectors 31a, 31b outside the cone of the focused incident light rays $23i$, the photodetectors will respond only to that portion of diffraction pattern identified by reference numeral $23r$. Accordingly, in this embodiment, photodetectors 31a, 31b will respond to radially scattered reflected light and derive electrical signals which when processed by summing amplifier 46, provide radio frequency information.

Figure 3A:
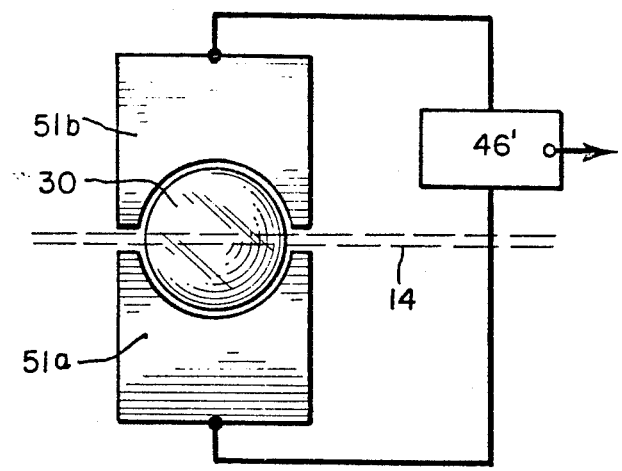
FIG. 3a depicts an alternative construction for the photodetector arrangement of FIG. 3.

FIG. 3a depicts an alternative construction for the photodetector arrangement of FIG. 3. In particular, it is noted that since those portions of photodetectors 31a and 31b that extend parallel to the track will collect, in this instance, unnecessary tangentially scattered light, the arrangement of FIG. 3a features a pair of photodetectors 51a, 51b which are foreshortened in the direction parallel to the track and of which the total area is thus smaller than of the semi-annular diodes shown in FIG. 3. As in the embodiment of FIG. 3, the photodetectors 51a, 51b straddle track 14 and have their output terminals connected to the input terminals of a summing amplifier 46'. Insofar as operation is concerned, the photodetector arrangement of FIG. 3a functions in the same manner as that previously described for the embodiment of FIG. 3.

Since reference was made earlier to the so called $\frac{1}{4}\lambda$ type of disc in which a signal representative of the modulated carrier is derived by tangential deflection rather than radial scattering a photodetector arrangement will now be described which is particularly suited for developing such a signal. Accordingly, there is disclosed in FIG. 4 a photodetector arrangement comprising a pair of photodetectors 61a, 61 symmetrically disposed about lens 30 and with their longitudinal axes parallel to the record track. This photodetector scheme is seen to adopt substantially the same construction as the photodetector arrangement of FIG. 3a with the above noted exception, that the photodetectors parallel rather than straddle the record track. This orientation of the photodetectors, of course, is to facilitate collection of tangentially deflected light returning from the interrogated portion of the record track. In response to this tangentially deflected light, the photodetectors develop electrical signals which are applied to the differential amplifier 48 which, in a known fashion, derives a time-varying signal which is a replica of the modulated carrier spatially recorded on track 14. This derived signal can then be processed through the stages associated with the optical playback system 10 in FIG. 1 to reconstitute the program recorded on the disc. More particularly, the output signal of differential amplifier 48 is first applied to an RF amplifier 50 from whence it is coupled, through a limiter 52, to a discriminator 54 wherein the signal is demodulated. The output of the discriminator is then coupled to a television receiver 56 which reconstitutes the program.

Moreover, it should be noted that, if a proper pilot signal is encoded in the composite signal employed to modulate the RF carrier, then detectors 61a, 61b, in conjunction with a differential amplifier, can be utilized to derive an error signal indicative of the degree, if any, of time base misregistration. Thereafter, when such a signal is suitably processed and applied to an apparatus of the type disclosed in U.S. Pat. No. 3,946,166, time base correction will be effected.

Figure 5:
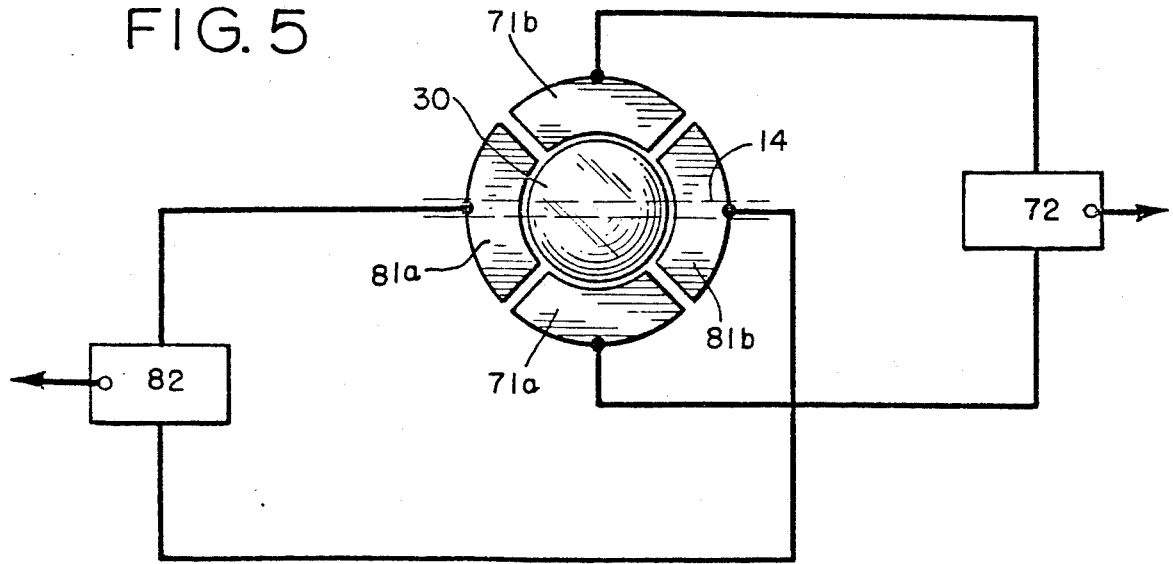
FIG. 5 is a plan view of a quadrant photodetector arrangement useful in the system of FIG. 1 for collecting, simultaneously, reflected radially and longitudinally scattered light.

Finally, there is disclosed in FIG. 5 a quadrant arrangement of photodetectors comprising a first pair of photodetectors 71a, 71b which are positioned in a confronting relation to objective lens 30 and straddling track 14 to collect radially deflected light and thus provide, through the agency of the differential amplifier 72, a control signal indicative of the condition of radial registration. Orthogonally disposed to this first pair, and interleaved therewith, is a second photodetector pair 81a, 81b also disposed in a confronting relation to lens 30 but with their axes parallel to track 14 so as to collect tangentially deflected light returning from the interrogated portion of the record track to develop an electrical signal for application to differential amplifier 82.

Figure 4:
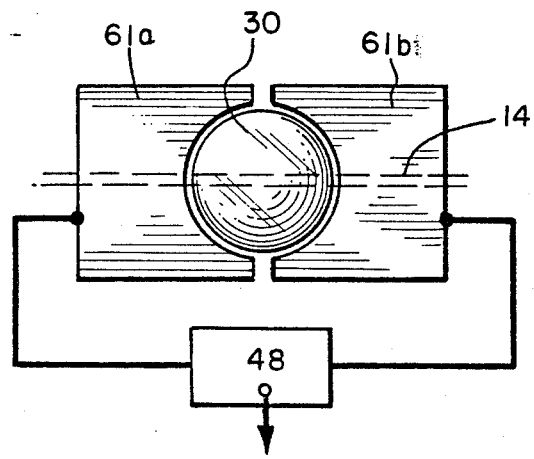
FIG. 4 is a plan view of a photodetector arrangement useful in the system of FIG. 1 for collecting reflected longitudinally scattered light.

In effect, the arrangement of FIG. 5 permit simultaneous monitoring of radially as well as tangentially deflected light returning from an interrogated portion of the record track. Insofar as placement of the quadrant arrangement of FIG. 5, as well as the detector arrangement of FIG. 4, is concerned, the same restrictions governing the principal embodiment of FIGS. 1-3a apply. That is, the photodetectors must be disposed on the same side of the disc as the objective lens, they must be in the far field region of the focused spot and they must reside outside the cone of focused light established by the objective lens forming the reading spot S.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

What is claimed is:
1. An optical system for detecting a timevarying information signal which has been converted to a modulated carrier and spatially recorded upon a record disc, which recording effectively constitutes a sequence of light scattering or light deflecting elements arranged along an elongated spiral track, said sequence comprising a spatial pattern representative of the modulated carrier, said optical detection system comprising:
   means for supporting said record disc in a reading plane;
   means for developing an optical read beam;
   means including an objective lens disposed in the path of said beam and on a predetermined side of said disc for focusing said read beam into a reading spot on said record track,
   said reading spot having a dimension relative to said spatial pattern of said track sufficient to resolve the highest spatial frequency of said recorded carrier;
   drive means for displacing said record, relative to said reading spot and at a predetermined velocity, to effect interrogation of said track by said reading spot so as to cause to be developed a reflected time-varying diffraction pattern of said spot that corresponds to said recorded spatial pattern,
   said diffraction pattern comprising a distribution of scattered or deflected light oriented predominantly in a predetermined direction relative to said track;
   and light responsive means, comprising a quadrant of photodetectors, disposed on the same side of disc as said objective lens and in the far field of said reading spot and outside the cone of focused light established by said objective lens in forming said reading spot,
   said quadrant including a first pair of photodetectors disposed on opposite sides of said objective lens and a second pair of photodetectors also disposed on opposite sides of said objective lens and orthogonally disposed to and interposed between said first pair,
   said first pair straddling said track to develop electrical signals in response to intercepted radially deflected light rays, said second pair being aligned parallel to said track to develop electrical signals in response to intercepted tangentially deflected light rays;
   said system further including a first amplifier responsive to said electrical signals developed by said first pair of photodetectors for deriving a tracking signal;
   and also including a second amplifier responsive to said electrical signals developed by said second pair of photodetectors for deriving a replica of said modulated carrier signals.

* * * * *